United States Patent
Everaert

(10) Patent No.: US 12,391,360 B2
(45) Date of Patent: Aug. 19, 2025

(54) ACTUATION ASSEMBLY, TRAILING EDGE FLAP ASSEMBLY, ACTUATION SYSTEM, AIRCRAFT WING, AND METHOD OF OPERATING AN AIRCRAFT

(71) Applicant: Asco Industries NV, Zaventem (BE)

(72) Inventor: Bob Armand Henri Everaert, Zaventem (BE)

(73) Assignee: Asco Industries NV, Zaventem (BE)

( * ) Notice: Subject to any disclaimer, the term of this patent is extended or adjusted under 35 U.S.C. 154(b) by 31 days.

(21) Appl. No.: 18/325,367

(22) Filed: May 30, 2023

(65) Prior Publication Data
US 2023/0406482 A1    Dec. 21, 2023

(30) Foreign Application Priority Data
Jun. 1, 2022   (EP) .................................... 22176859

(51) Int. Cl.
*B64C 9/16* (2006.01)
(52) U.S. Cl.
CPC .................................... *B64C 9/16* (2013.01)
(58) Field of Classification Search
CPC ....................................................... B64C 9/16
See application file for complete search history.

(56) References Cited

U.S. PATENT DOCUMENTS

| | | | |
|---|---|---|---|
| 2,620,147 A | 12/1952 | Butler et al. | |
| 6,076,775 A * | 6/2000 | Bauer | B64C 9/18 |
| | | | 244/215 |
| 8,393,799 B2 * | 3/2013 | Dahl | F16C 19/46 |
| | | | 384/569 |
| 9,346,534 B2 * | 5/2016 | Langley | B64C 9/16 |
| 10,899,431 B2 * | 1/2021 | Lorenz | B64C 13/40 |
| 11,174,003 B2 * | 11/2021 | Mokhtarian | B64C 9/18 |
| 11,208,199 B2 * | 12/2021 | Tfaily | B64C 7/00 |

(Continued)

FOREIGN PATENT DOCUMENTS

| | | |
|---|---|---|
| EP | 3301018 | 4/2018 |
| EP | 3670330 | 6/2020 |

(Continued)

OTHER PUBLICATIONS

Extended European Search Report, EP Application No. 22176859.1, dated Nov. 10, 2022, 10 pages.

*Primary Examiner* — Joshua J Michener
*Assistant Examiner* — Michael B. Kreiner
(74) *Attorney, Agent, or Firm* — Quarles & Brady LLP

(57) ABSTRACT

Actuation assembly for a trailing edge flap of an aircraft wing, comprising: a track fixable to the aircraft wing; a carriage arranged on the track so as to be movable across a range of carriage positions along the track; a flap-to-carriage connector configured to hingeably connect the carriage to a leading edge of the flap so as to determine a flap-to-carriage hinging axis extending transverse to a main track direction of the track at the leading edge of the flap; and a first actuator configured to controllably rotate the flap with respect to the carriage about the flap-to-carriage hinging axis, wherein the actuation assembly is configured to enable the flap, when connected, to be adjusted with respect to the wing between a retracted flap position and an extended flap position by moving the carriage within the range of carriage positions along the track.

24 Claims, 6 Drawing Sheets

(56) References Cited

U.S. PATENT DOCUMENTS

| 11,338,907 B2 * | 5/2022 | Young | B64C 9/00 |
| 2023/0271696 A1 * | 8/2023 | Andreani | B64C 9/16 |
| | | | 244/99.3 |

FOREIGN PATENT DOCUMENTS

| FR | 2767111 | 2/1999 |
| GB | 2568743 | 5/2019 |
| JP | S512198 | 1/1976 |

* cited by examiner

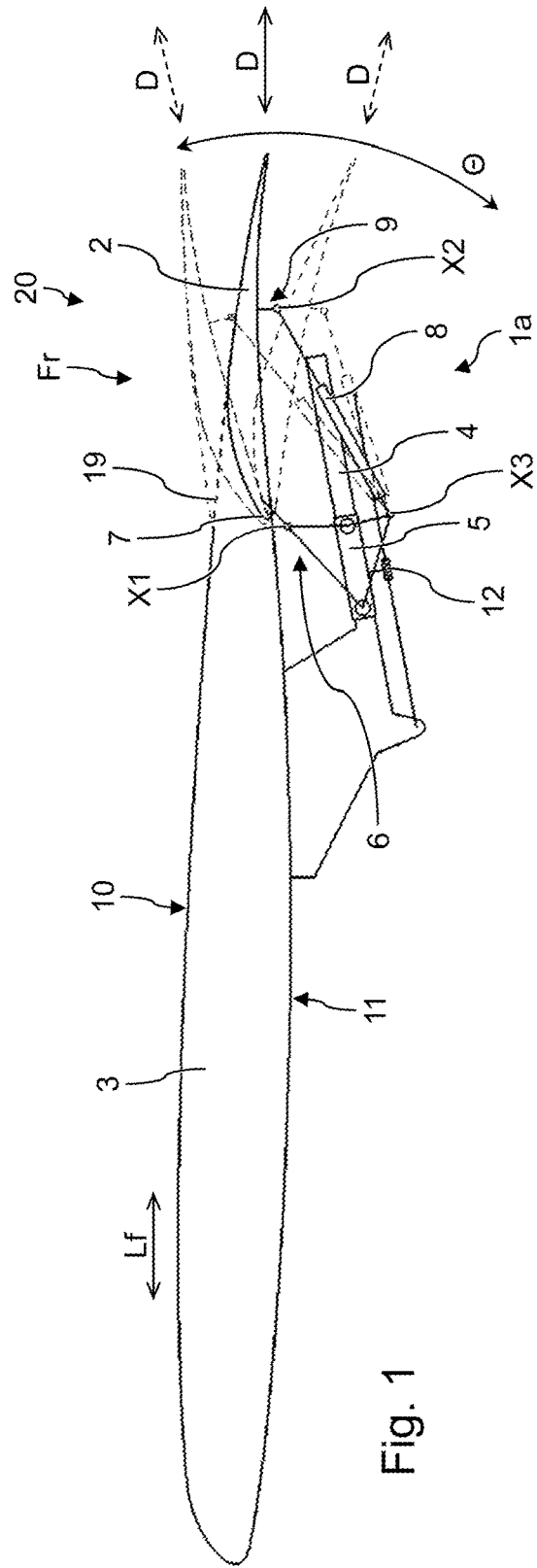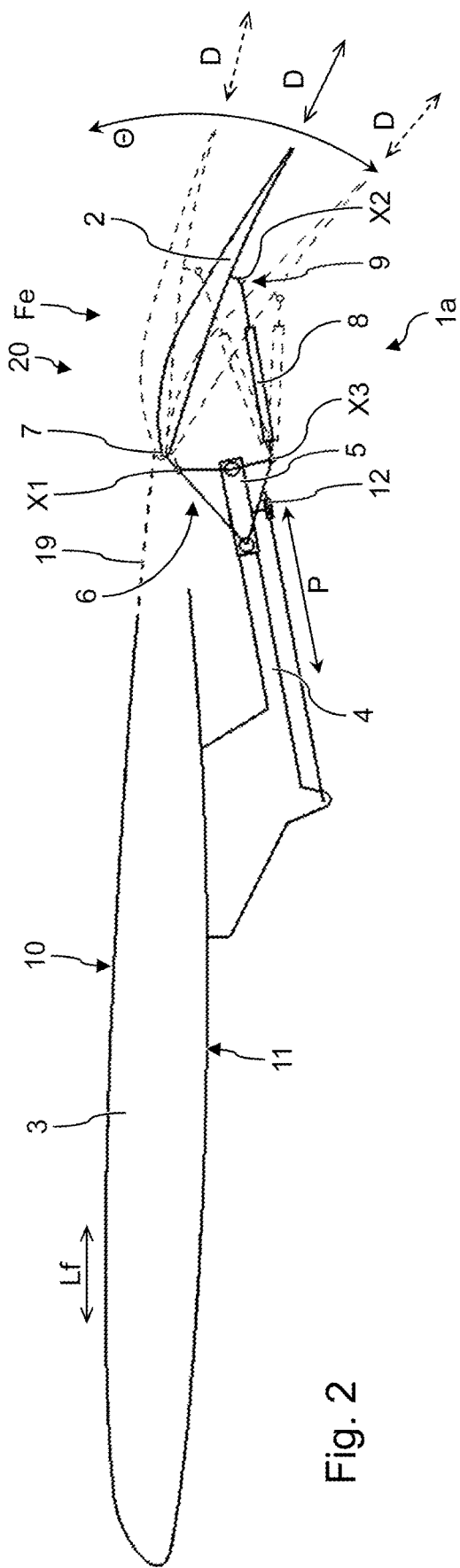

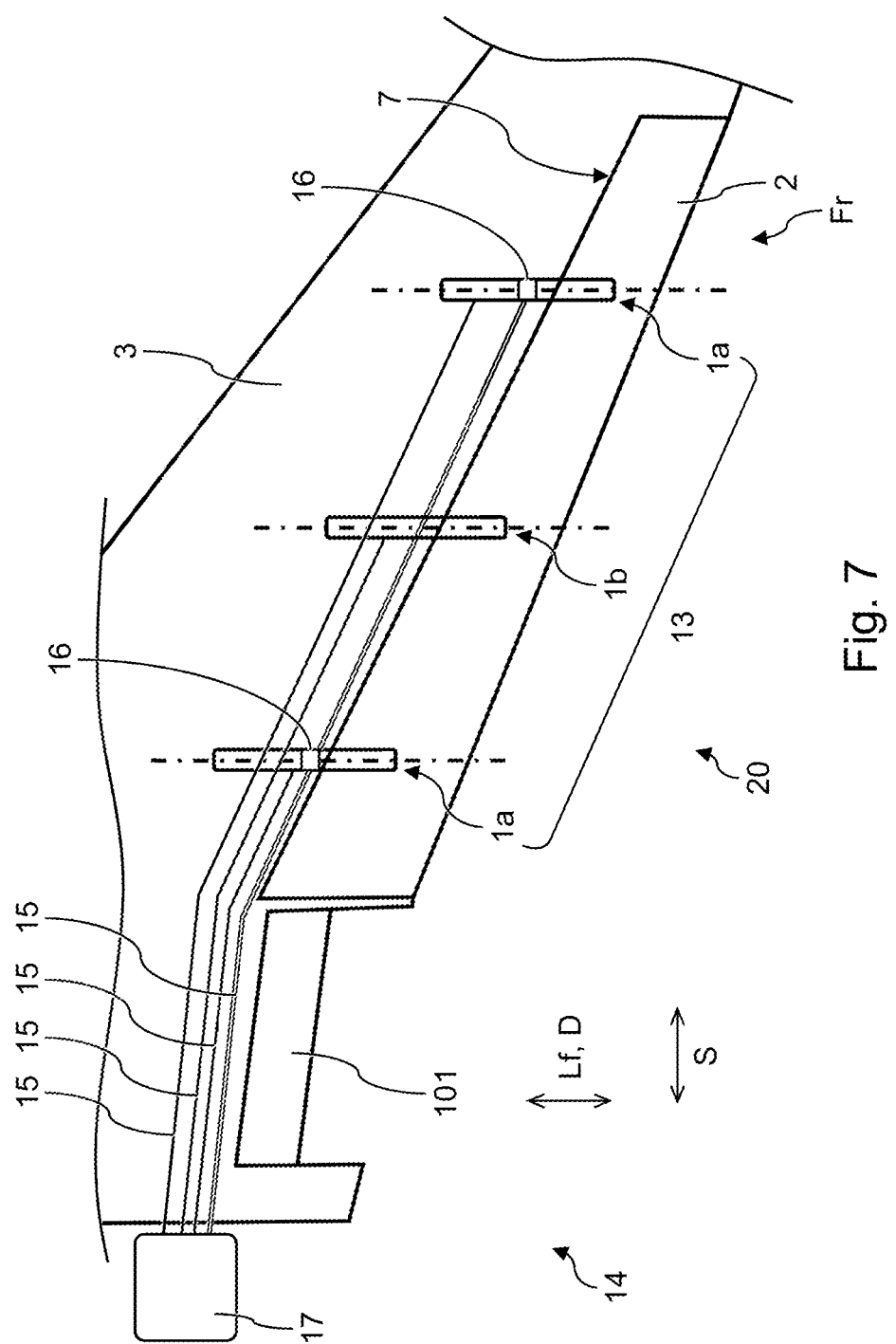

ACTUATION ASSEMBLY, TRAILING EDGE FLAP ASSEMBLY, ACTUATION SYSTEM, AIRCRAFT WING, AND METHOD OF OPERATING AN AIRCRAFT

FIELD

The disclosure relates to an actuation assembly for a trailing edge flap of an aircraft wing, as well as to: a set of such assemblies, an actuation system comprising such an assembly, an aircraft wing provided with such a system, an aircraft having such a wing, and a method of operating such an aircraft.

BACKGROUND

To improve fuel efficiency in aviation, it has been hypothesized that traditionally separate high-lift devices and ailerons for aircraft wings could be combined, in particular in the form of a so-called multifunctional trailing edge flap. Compared to traditional trailing edge flaps and ailerons, which are generally arranged next to each other along the wing, such a combined or multifunctional flap may have a relatively large spanwise width, resulting in increased effectiveness at same flap angles, or similar effectiveness at smaller flap angles.

However, it has been found that such a trailing edge flap cannot be actuated in a satisfactory manner using available actuation means, in particular compared to a combined functionality of traditional high-lift devices and ailerons. In particular, there is a desire to reduce an interdependency of the high-lift function and the aileron function and to enable a larger variety of possible flap positions and motions. For example, it is desired to enable so-called Fowler motion as well as full aileron motions for a same flap.

SUMMARY

An object of the disclosure is to enable improved actuation of a trailing edge flap of an aircraft wing, in particular to provide both a relatively complete high-lift function and a relatively complete aileron function using the same trailing edge flap. An object is to improve efficiency, reliability and/or versatility of aircraft. An object is to enable Fowler motion as well as aileron motions for the same flap. An object is to provide at least an alternative actuation means for a trailing edge flap of an aircraft wing.

An aspect of the disclosure provides an actuation assembly for a trailing edge flap of an aircraft wing. The actuation assembly comprises: a track fixable to the aircraft wing; a carriage arranged on the track so as to be movable across a range of carriage positions along the track; a flap-to-carriage connector configured to hingeably connect the carriage to a leading edge of the flap so as to determine a flap-to-carriage hinging axis extending transverse to a main track direction of the track at the leading edge of the flap; and a first actuator configured to controllably rotate the flap with respect to the carriage about the flap-to-carriage hinging axis.

The actuation assembly is configured to enable the flap, when connected, to be adjusted with respect to the wing between a retracted flap position and an extended flap position by moving the carriage within the range of carriage positions along the track.

Such an actuation assembly enables the trailing edge flap to be actuated in a relatively versatile way for both high-lift and aileron functions, as desired, in particular corresponding to substantially any combination of high-lift and aileron functionality as is traditionally provided by separate high-lift devices and ailerons. By the arrangement of the track and the carriage, a high-lift function can be provided if and when desired by the flap in the extended flap position, whereas at other times the flap may be held in the retracted position to limit drag. Meanwhile, since the flap-to-carriage hinging axis essentially follows the carriage along the track, the flap can be rotated by the first actuator to provide an aileron function if and when desired, substantially irrespective of whether the flap is in the extended flap position or the retracted position. As such, the flap can become a trailing edge control surface that can function as a high lift device between the retracted and the extended position, and as an aileron between a base position and a rotated position. The rotated position can be an upward position or a downward position. It is noted that rotation by the first actuator is possible in any position between the extended and retracted position of the flap. The flap can be rotated by the at least first actuator between the base position and the upward position, or downward position. In upward position and/or downward position, typically the flap is functioning as an aileron. In base position, or downward position, the flap can be functioning as a high-lift device. Such trailing edge control surface that can function both as a high-lift device as well as an aileron, may also be known as flaperon.

Without wishing to be bound by theory, it is believed that the arrangement of the flap-to-carriage hinging axis at the leading edge of the flap plays an important role in enabling full aileron functionality irrespective of whether the flap is in the retracted position or the extended flap position at that time. Thus, using such an actuation assembly, a single trailing edge flap may be used with full aileron functionality as well as with full high-lift functionality. By contrast, known actuation assemblies, in particular with a differently arranged hinging axis for the flap, tend to inherently limit at least some such functionalities, e.g. limiting aileron functionality to be mainly or only available in the fully extended flap position and less or not in the retracted flap position.

Moreover, a so-called Fowler motion of the flap can thus be provided, in which the flap, starting from the retracted position, is first adjusted to the extended position substantially by a translation movement along the track, and is subsequently rotated downwards about the flap-to-carriage hinging axis, e.g. by about 25 degrees. Meanwhile, upward and downward aileron motions can remain possible, in particular both in the retracted flap position and in any extended flap position. More particularly upward and downward aileron functionality of the flap is possible in any extended flap position along the track, not only in the fully extended position or in the retracted position.

As explained elsewhere herein, to controllably position the carriage along the track, the actuation assembly, and/or e.g. a neighboring actuation assembly, may further comprise a second actuator.

Although the connection between the carriage and the leading edge of the flap as provided by the flap-to-carriage connector is hingeable, the flap-to-carriage connector may link the carriage to the flap so as to determine a substantially fixed distance between the carriage and the leading edge of the flap, at least when viewed in the spanwise direction of the wing. Thus, the flap-to-carriage connector may be free from any further hinging axes parallel to the flap-to-carriage hinging axis, and free from any deformable or extendible parts which could cause said distance to be variable.

Further, the flap-to-carriage connector may be configured to extend upwardly from the carriage towards the leading edge of the flap so as to connect to the leading edge of the flap from below, in particular to leave a topside of the flap free from any connection to the carriage and/or the actuation assembly.

The rotation of the flap about the flap-to-carriage hinging axis and the movement of the carriage along the track may be mutually independent.

In this way, mutual independence of the high-lift and aileron functions of the flap can be promoted. In traditional Fowler flaps, translation and rotation of the flap are mutually coupled, so that the same flap normally cannot be used as an aileron.

The track may be straight so as to define a substantially pure translation movement of the carriage with respect to the wing.

Thereby, translation and rotation of the flap can be actuated separately and independently, resulting in relatively simple yet versatile flap control.

The first actuator may interconnect and/or be arranged between the carriage and the flap. As such, aileron functionality as induced by the first actuator can be possible in any position of the carriage along the track, and thus in any flap position. Upward and downward movement of the flap to enable the aileron functionality can be provided also in retracted position and in fully extended position as well as in any position between the retracted position and the fully extended position.

The first actuator may be configured to engage the flap at a flap engagement position spaced apart from the leading edge of the flap, in particular spaced apart along the main track direction.

Since the flap-to-carriage hinging axis is at the leading edge of the flap, such a flap engagement position can advantageously utilize a moment arm with respect to the flap-to-carriage hinging axis, in particular utilizing at least part of an available chordwise size of the flap.

The flap engagement position may be an intermediate position between the leading edge and a trailing edge of the trailing edge flap, In some embodiments between one and three quarters of the way between said edges, for example about halfway between said edges. The flap engagement position may be at an underside of the flap, in particular when the track is fixed to an underside of the wing. In this way, an airfoil shape of a top side of the flap can remain undisturbed by the actuation assembly.

The first actuator may be configured to be hingeably connected to the flap about a first-actuator-to-flap hinging axis extending at the flap engagement position substantially parallel to the flap-to-carriage hinging axis.

Such a hingeable connection advantageously enables a continuous engagement between the first actuator and the flap, in particular for a variety of flap rotations about the flap-to-carriage hinging axis.

The first actuator may be hingeably connected to the carriage about a carriage-to-first-actuator hinging axis extending substantially parallel to the flap-to-carriage hinging axis, in particular at a distance from the flap-to-carriage hinging axis.

In this way, the first actuator can advantageously remain operably engaged with both the carriage and the flap for a variety of flap rotations about the flap-to-carriage hinging axis, wherein in particular the first actuator can at least partly move along with the flap.

The first actuator may comprise a linear actuator, for example a hydraulic piston-cylinder assembly or a linear motor.

Such an actuator can provide particularly reliable and precise actuation.

Alternatively, or additionally, the first actuator could comprise one or more rotary actuators, for example a servo motor, optionally with a transmission such as a gear set.

The first actuator may be configured to rotate the flap with respect to the carriage about the flap-to-carriage hinging axis across a range of flap-to-carriage angles. The range of flap-to-carriage angles in various embodiments may have a size of at least 20 degrees, at least 30 degrees, and at least 40 degrees, for example, about 55 degrees.

Such a range of flap-to-carriage angles may advantageously correspond to a range of aileron positions of the flap, wherein a larger range can correspond to a more expansive or complete aileron functionality. Moreover, such a range of flap-to-carriage angles may enable a Fowler motion of the flap in combination with such a range of aileron positions. For example, a range of flap-to-carriage angles of 55 degrees may enable to combine a downward rotation associated with the Fowler motion of about 25 degrees with a range of aileron positions of 15 degrees upward to 15 degrees downward in both the extended flap position and the retracted flap position.

It shall be appreciated that in the retracted flap position and/or the extended flap position a usable range of flap-to-carriage angles may be smaller than what the first actuator is configured for. For example, in the retracted flap position, the usable range may be limited by the track extending towards the flap, so that e.g., an upper 30 degrees of a 55 degree total range may be usable. Conversely, in the extended flap position, it may be desired to avoid an upper part of the total range, in particular in view of a Fowler motion as explained elsewhere herein, so that e.g., a lower 30 degree of the total range may be usable. The relevant usable part of the range may be enforced by a configuration of a controller, for example.

The range of flap-to-carriage angles may comprise both positive and negative angles, corresponding to both downward and upward aileron positions of the flap with respect to the wing.

Thereby, the aileron function of the flap can be bidirectional, in particular also in the retracted flap position.

The track may be configured to extend tilted with respect to a plane along which the aircraft wing mainly extends when the track is fixed to the aircraft wing.

In this way, the extended flap position can advantageously correspond to a position relative to the wing in which high-lift functionality is promoted, in particular optimized for the respective airfoil profile shapes of the wing and the flap, for example in view of a spacing and/or relative orientation between such airfoil profile shapes. The tilting may for example approximately correspond to an airfoil profile shape of the wing in the area where the track is fixed to the wing.

In various embodiments, an extent of the range of positions along the track corresponds to at least 30%, and may be at least 40%, for example about 50%, of a chordwise size of the flap and/or a size of the flap along a line-of-flight direction of the wing.

In this way, a distance between the retracted flap position and the extended flap position can be relatively large, wherein for example in the retracted flap position the flap may be at least partly covered by the wing, for example by a spoiler of the wing, and in the extended flap position the flap may be substantially exposed with respect to the wing.

The actuation assembly may further comprise a second actuator configured to controllably position the carriage along the track, in particular across the range of carriage positions.

Such an optional second actuator may advantageously enable controlled positioning of the carriage along the track. Such a second actuator may comprise a linear actuator, for example a hydraulic piston-cylinder assembly or a linear motor.

Alternatively, the actuation assembly may be free from such a second actuator, for example when the actuation assembly is part of a set in which one or more other actuation assemblies comprise such a second actuator, or at least a similar actuator suitable to cause a similar translation movement of the flap with respect to the wing. In that case, the carriage may be actuated indirectly via de other actuation assembly and the wing and the flap, wherein the carriage may then essentially follow the carriage of the other actuation assembly, e.g., a neighboring assembly along the same wing and flap.

By limiting the number of actuation assemblies comprising such a second actuator to one or two per trailing edge flap, so-called force fighting among the second actuators can advantageously be prevented. In case of a relatively large spanwise size of the trailing edge flap, two actuation assemblies each comprising such a second actuator may be provided, whereas a single second actuator per flap may suffice for smaller flaps.

The flap-to-carriage connector may be configured to permit one or more movements of the flap with respect to the carriage otherwise than about the flap-to-carriage hinging axis, in particular in one or more directions corresponding to a lateral or spanwise direction of the wing.

In this way, deformations of the flap with respect to the wing may be accommodated, in particular while avoiding excessive strain in the actuation assembly.

Alternatively, the flap-to-carriage connector may be configured to limit movement of the flap with respect to the carriage to rotations about the flap-to-carriage hinging axis only.

Such an actuation assembly may advantageously determine a lateral position of the flap with respect to the wing, at least at the respective actuation assembly.

A further aspect provides a set of actuation assemblies for a trailing edge flap of an aircraft wing. The set comprises at least one actuation assembly as described herein wherein the flap-to-carriage connector is configured to permit one or more movements of the flap with respect to the carriage otherwise than about the flap-to-carriage hinging axis, in particular in one or more directions corresponding to a lateral or spanwise direction of the wing. The set further comprises at least one, and in some embodiments only one, actuation assembly as described herein wherein the flap-to-carriage connector is configured to limit movement of the flap with respect to the carriage to rotations about the flap-to-carriage hinging axis only.

Such a set provides above-described advantages, wherein during use the actuation assemblies of the set may for example be distributed along the spanwise direction of the same wing and flap. In particular, a lateral position of the flap with respect to the wing can then be determined by a single actuation assembly while at the same time allowing for deformations at the other actuation assembly or assemblies. In this sense, the actuation assembly limiting the flap movements as described may be regarded as a 'master', while one or more actuation assemblies permitting other flap movements as described may be regarded as 'slaves'. By limiting the number of such 'master' assemblies to one per wing-and-flap combination, lateral strain can advantageously be avoided.

A further aspect provides a trailing edge flap assembly for an aircraft wing, comprising a trailing edge flap for an aircraft wing and at least one actuation assembly as described herein, preferably a set of actuation assemblies as described herein, wherein the flap-to-carriage connector of each actuation assembly hingeably connects the respective carriage to a leading edge of the flap, wherein the first actuator may be hingeably connected to the flap at a flap engagement position spaced apart from the leading edge of the flap.

Such a trailing edge flap assembly provides above-described advantages, and may advantageously be mounted to an aircraft wing essentially as one unit, e.g., a pre-assembled unit.

A further aspect provides an actuation system for a trailing edge flap of an aircraft wing, comprising at least one actuation assembly as described herein and one or more control lines, e.g. hydraulic and/or electronic control lines, for operatively connecting the first actuator of each actuation assembly to a controller outside the respective actuation assembly.

Such an actuation system provides above-described advantages, wherein the one or more control lines can enable centralized control of at least the rotation of the flap about the flap to carriage hinging axis, corresponding to an aileron function and/or part of a Fowler motion. Such control may for example be via a more general control system associated with the aircraft, e.g., operated from an aircraft cockpit and/or remotely.

The at least one actuation assembly may comprise a set of actuation assemblies as described herein, providing corresponding advantages.

For any actuation assembly comprising a second actuator as described herein, the one or more control lines may be also for operatively connecting the respective second actuator to the controller.

In this way, also adjustment between the retracted flap position and the extended flap position may be affected through centralized control, thereby enabling substantially full control of both high-lift and aileron functions, which may include the Fowler motion and including full aileron functionality in both the retracted flap position and the extended flap position.

The actuation system may comprise a trailing edge flap assembly as described herein.

The actuation system further may comprise the controller, wherein the controller is configured to control the trailing edge flap with respect to the aircraft wing using the at least one actuation assembly.

In case of hydraulic actuators, such a controller may be configured to controllably adjust a hydraulic pressure in the actuator. In case of electric actuators, e.g., linear motors, such a controller may be configured to controllably adjust an electric power supply and/or control signal to the electric actuator. More generally, the controller may be configured to provide feed-forward and/or feed-back based control, e.g., using one or more sensors to obtain a feedback signal. Such sensors may be separate from the control line and actuators and/or may be integrated therein.

A further aspect provides an aircraft wing provided with a trailing edge flap and an actuation system as described herein arranged to actuate the flap with respect to the aircraft wing, wherein the respective track of each actuation assembly of the actuation system is fixed to the aircraft wing, in particular to extend along a line-of-flight direction of the aircraft wing, wherein the respective flap-to-carriage connector of each actuation assembly of the actuation system hingeably connects the respective carriage to the leading edge of the flap, in particular to determine the flap-to-carriage hinging axis.

A further aspect provides an aircraft having one or more aircraft wings as described herein.

Such an aircraft wing and aircraft provide above-described advantages, in particular enabling improved fuel economy compared to traditional aircraft, with similar or improved handling capabilities. Advantageously, the trailing edge flap can be used as a so-called multifunctional trailing edge flap with full high-lift as well as full aileron functionality. As a result, traditional flaps and ailerons may be obviated, although it is not excluded that the wing is provided with one or more further flaps and/or ailerons, for example a traditional separate inboard flap. The number of multifunctional trailing edge flaps per wing is preferably one, since this generally enables a weight reduction compared to a larger number of flaps per wing. Still, it is not excluded that a wing could comprise multiple of such multifunctional flaps, for example one as an inboard flap and one as an outboard flap.

A further aspect provides a method of operating an aircraft, comprising: providing an aircraft as described herein; and, using the controller, adjusting the flap between the retracted flap position and the extended flap position and/or rotating the flap with respect to the carriage about the flap-to-carriage hinging axis.

Such a method provides above-described advantages.

Using the controller, the flap may be controlled to act both as a high-lift device and as an aileron, for example sequentially and/or simultaneously.

Thereby, traditional separate high-lift devices and ailerons can be obviated, allowing weight reduction and improved fuel efficiency.

Using the controller, the flap may be controlled to exert a Fowler motion, in particular at a time of moving between the retracted flap position and the extended flap position.

It shall be appreciated that, as used herein, the terms retracted flap position and extended flap position are not limiting with respect to an aileron position and/or a flap rotation about the flap-to-carriage hinging axis. Thus, the terms essentially merely distinguish different positions of the flap-to-carriage hinging axis, which is at the leading edge of the flap. Moreover, it shall be appreciated that the flap may be actuated and/or controlled, in particular by the second actuator, to be at intermediate positions between the retracted flap position and the extended flap position, corresponding to intermediate carriage positions along the track.

BRIEF DESCRIPTION OF THE DRAWINGS

In the following, the disclosure will be explained further using examples of embodiments and drawings. The drawings are schematic and merely show examples. In the drawings, corresponding elements are indicated with corresponding reference signs. In the drawings:

FIG. 1 shows a cross sectional view of an aircraft wing with a trailing edge flap in a retracted flap position, with various possible aileron positions of the flap;

FIG. 2 shows a cross sectional view of the aircraft wing with the trailing edge flap in an extended flap position, with various possible aileron positions of the flap;

FIG. 7 shows a bottom view of an aircraft wing with a trailing edge flap and an actuation system.

DETAILED DESCRIPTION

Figure 3A:
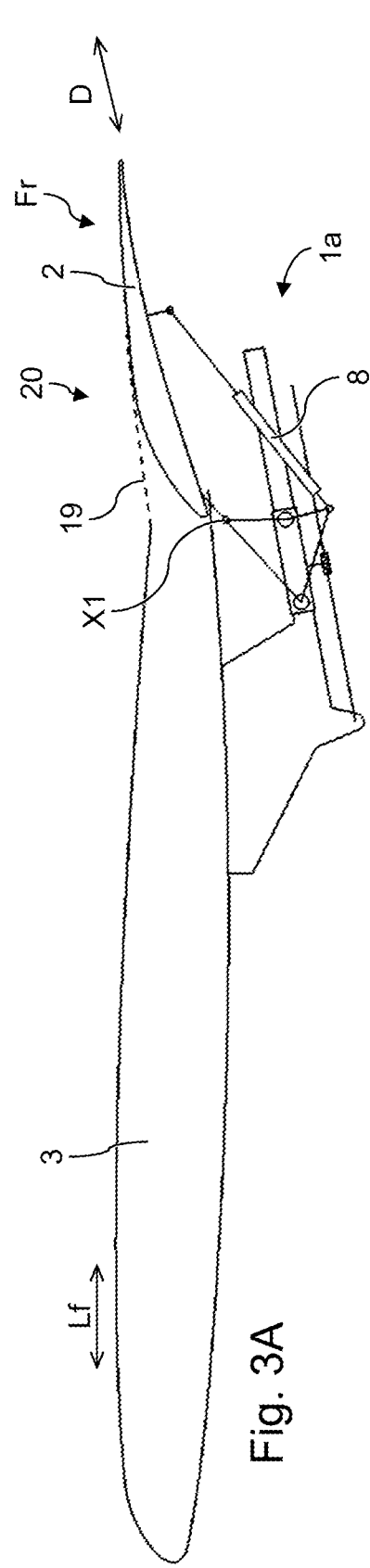
FIGS. 3A-C show the various flap positions of FIG. 1 separately per figure.

The figures show examples of an actuation assembly 1 for a trailing edge flap 2 of an aircraft wing 3. In the figures, reference signs 1a and 1b are used to denote different variants of a more general actuation assembly 1, as explained further elsewhere herein. For conciseness, reference sign 1 is used in the present description to explain features common to both variants.

The actuation assembly 1 comprises: a track 4 fixable to the aircraft wing 3; a carriage 5 arranged on the track 4 so as to be movable across a range P (see FIG. 2) of carriage positions along the track 4; a flap-to-carriage connector 6 (also indicated in the figures as 6a or 6b to denote different variants) configured to hingeably connect the carriage 5 to a leading edge 7 of the flap 2 so as to determine a flap-to-carriage hinging axis X1 extending transverse to a main track direction of the track at the leading edge 7 of the flap 2; and a first actuator 8 configured to controllably rotate the flap 2 with respect to the carriage 5 about the flap-to-carriage hinging axis X1. As explained elsewhere herein, the assembly 1 may further comprise a second actuator 12 configured to controllably position the carriage 5 along the track 4, although this is not always necessary.

The actuation assembly 1 is configured to enable the flap 2, when connected, to be adjusted with respect to the wing 3 between a retracted flap position Fr (see e.g. FIGS. 1 and 3A-C) and an extended flap position Fe (see e.g. FIGS. 2 and 4A-C) by moving the carriage 5 within the range P of carriage positions along the track.

In the shown examples, the flap-to-carriage connector 6 extends upward from the carriage 5 to connect to the leading edge 7 of the flap 2 from below.

Figure 5A:
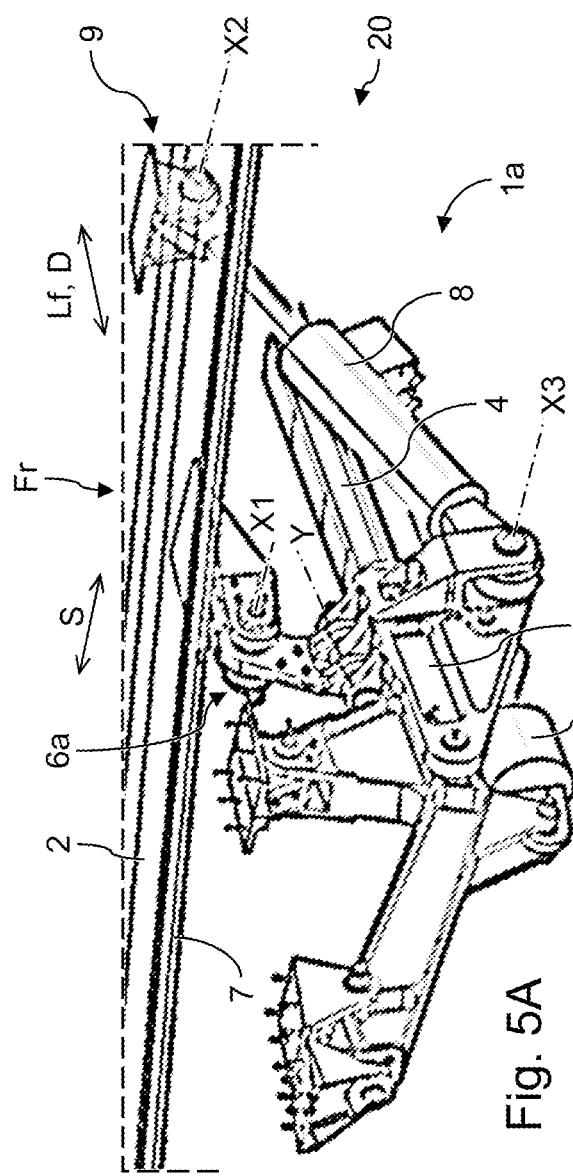
FIGS. 5A and 5B each show a perspective view of an actuation assembly.

In the shown examples, the flap-to-carriage connector 6 links the leading edge 7 of the flap 2 to the carriage 5 so as to determine a substantially fixed distance between the carriage and the leading edge of the flap, at least when viewed in the spanwise direction S of the wing 3. Still, the flap-to-carriage connector 6 may be configured to allow certain movements between flap 2 and carriage 5 otherwise than about the flap-to-carriage hinging axis X1, as explained elsewhere herein with reference to FIG. 5A showing a variant 6a of the flap-to-carriage connector 6.

FIGS. 1 and 2 each show different possible flap rotation positions together in a single figure. The various different flap positions are shown separately in FIGS. 3A-C and 4A-C, respectively, wherein fewer reference signs are shown compared to FIGS. 1 and 2 for additional clarity of the drawings themselves. It shall be appreciated that all elements and structures explicitly indicated in FIGS. 1 and 2 can correspondingly be seen in FIGS. 3A-C and 4A-C as well.

An optional spoiler 19 is shown in FIGS. 1 to 4C. Such a spoiler 19 may be configured and/or controlled to follow the flap 2, at least so as to avoid collision between spoiler 19 and flap 2, as can be seen e.g., in FIG. 3A. It shall be appreciated that such a spoiler, although providing advantages, is generally not strictly necessary.

In the shown examples, the rotation of the flap about the flap-to-carriage hinging axis X1 and the movement of the carriage 5 along the track 4 are mutually independent.

In the shown examples, the first actuator 8 is configured to engage the flap 2 at a flap engagement position 9 spaced apart from the leading edge 7 of the flap 2, in particular spaced apart along the main track direction.

In the shown examples, the first actuator 8 is configured to be hingeably connected to the flap 2 about a first-actuator-to-flap hinging axis X2 extending at the flap engagement position 9 substantially parallel to the flap-to-carriage hinging axis X1.

In the shown examples, the first actuator 8 is hingeably connected to the carriage 5 about a carriage-to-first-actuator hinging axis X3 extending substantially parallel to the flap-to-carriage hinging axis X1.

In the shown examples, the first actuator 8 comprises, in particular is, a linear actuator. The linear actuator is here a hydraulic piston-cylinder assembly, but could alternatively be e.g., a pneumatic piston-cylinder assembly, a rack-and-pinion assembly, or a linear motor.

In the shown examples, the first actuator 8 is configured to rotate the flap 2 with respect to the carriage 5 about the flap-to-carriage hinging axis X1 across a range Θ of flap-to-carriage angles. In FIGS. 1 and 2, it can be seen that a main airfoil direction D of the flap 2 varies as a function of the flap-to-carriage angle about the flap-to-carriage hinging axis X1.

Figure 3B:
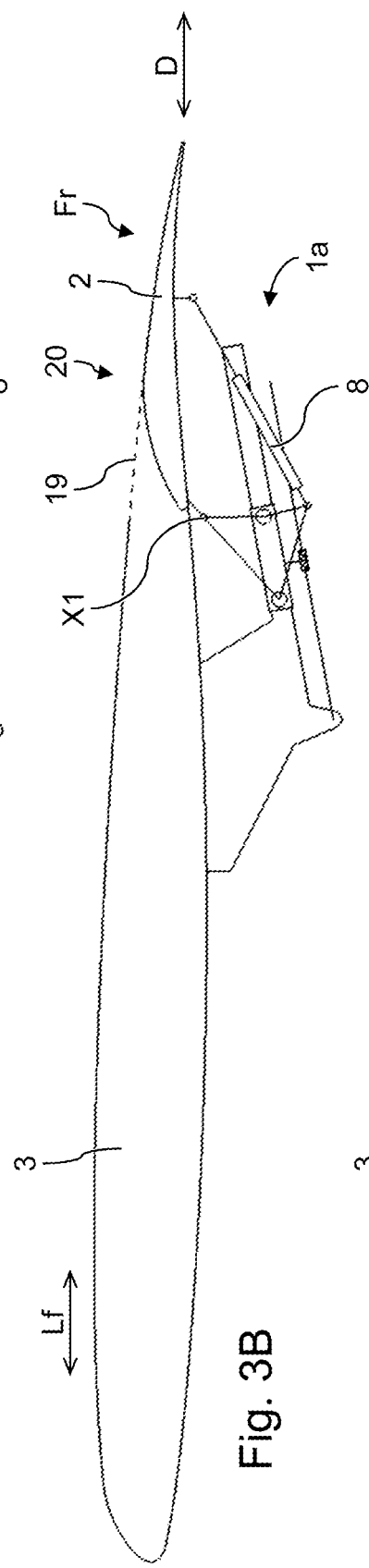
Figure 3C:
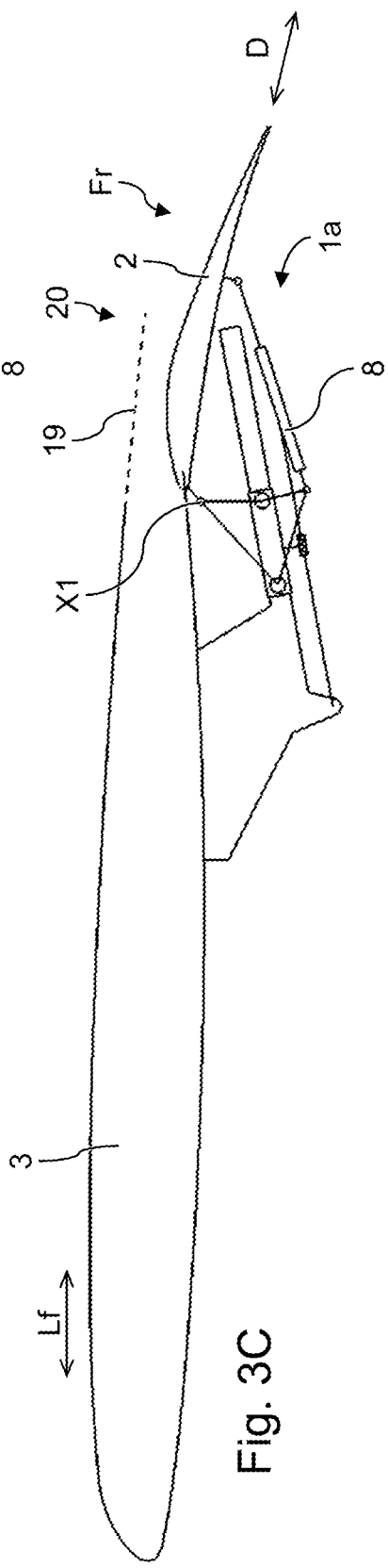

In the retracted flap position Fr, the flap-to-carriage angle may be set so that the main airfoil direction D of the flap 2 is aligned with the line-of-flight direction Lf of the wing 3 to provide a so-called neutral aileron position of the flap 2, as shown in FIG. 3B and with continuous lines in FIG. 1. From the neutral position, the flap 2 may be rotated upwards or downwards to provide corresponding aileron positions, as shown in FIGS. 3A and 3C and with dashed lines in FIG. 1.

Figure 4A:
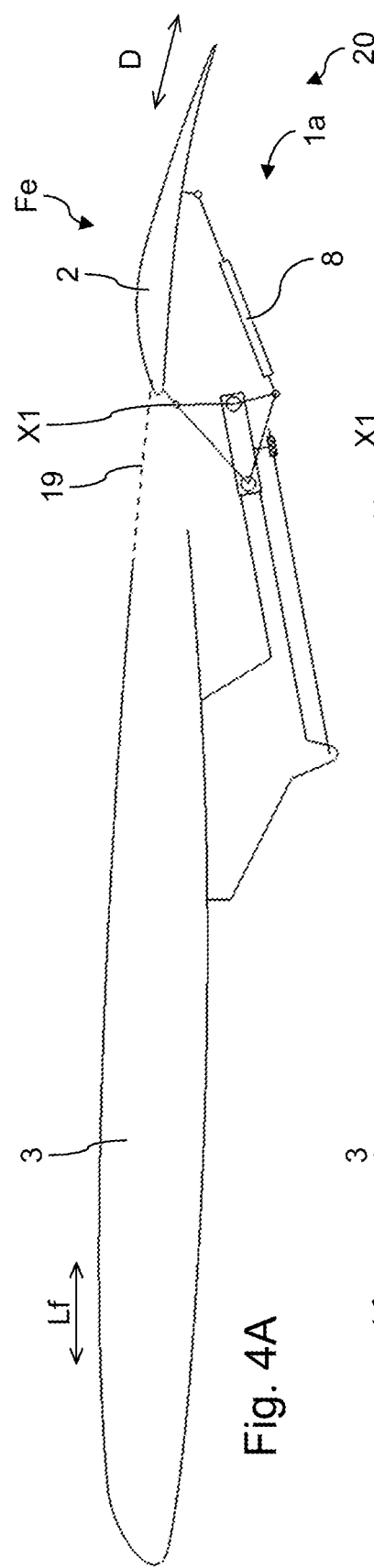
FIGS. 4A-C show the various flap positions of FIG. 2 separately per figure.
Figure 4B:
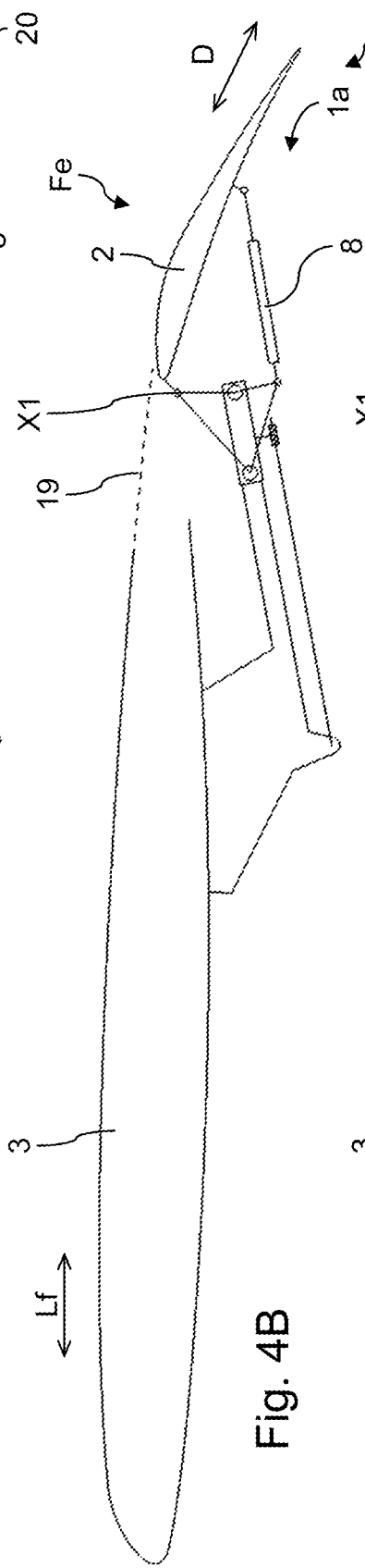
Figure 4C:
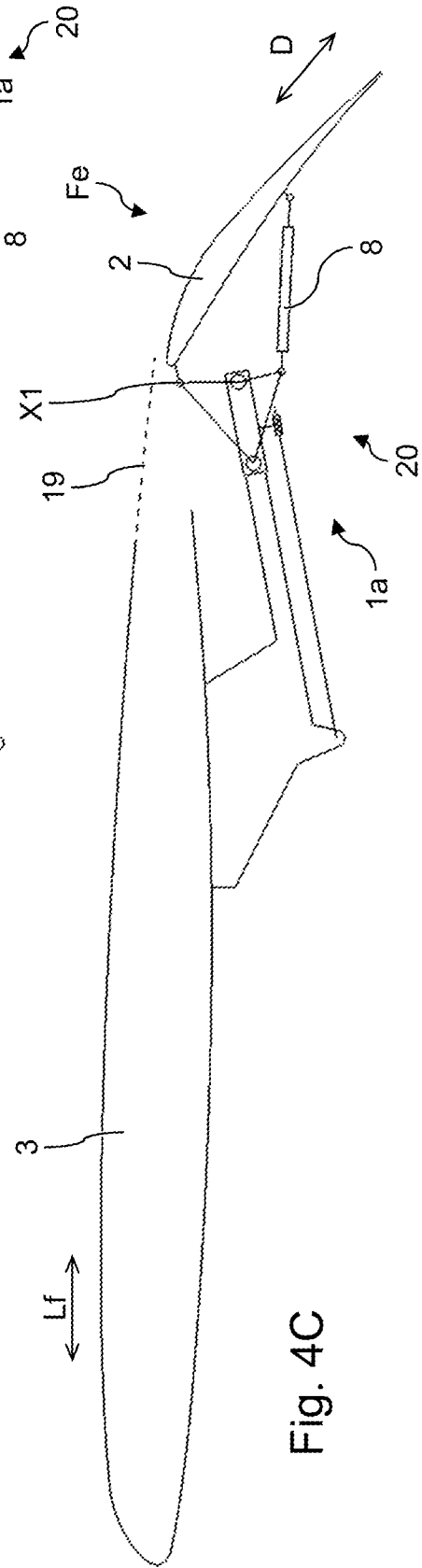

In the extended flap position Fe, a similar 'neutral' aileron position may correspond to the main airfoil direction D extending downwards from the leading edge 7 of the flap, as shown in FIG. 4B and with continuous lines in FIG. 2. This difference compared to the retracted flap position Fr is here due to a Fowler motion of the flap 2 between the retracted flap position Fr and the extended flap position Fe. Still, also from such a neutral position, the flap 2 may be rotated upwards or downwards to provide corresponding aileron positions in the extended flap position Fe, as shown in FIGS. 4A and 4C and with dashed lines in FIG. 2.

The range Θ of flap-to-carriage angles here has a size of about 55 degrees, of which an upper subrange of about 30 degrees is available in the retracted flap position Fr and about the full 55 degrees is available in the extended flap position Fe. Still, with reference to FIG. 2 and in view of the Fowled motion as described above, in the extended flap position Fe, it may be preferred to use only a lower subrange of about 30 degrees.

By comparing FIGS. 1 and 2, as alluded to above, it can be seen that the respective flap positions indicated by continuous lines differ by both a translation and a rotation (here of about 25 degrees), wherein said flap positions correspond to end positions of a Fowler motion with otherwise 'neutral' aileron positions. Meanwhile, dashed lines in both FIGS. 1 and 2 indicate respective aileron positions of both positive and negative 15 degrees with respect to said 'neutral' positions. In this sense, the range Θ of flap-to-carriage angles here comprises both positive and negative angles, corresponding to both downward and upward aileron positions of the flap 2 with respect to the wing 3. Thus, both a full high-lift functionality, including a Fowler motion, as well as a full aileron functionality are provided, in particular mutually independently.

In the shown examples, the track 4 is configured to extend tilted with respect to a plane along which the aircraft wing 3 mainly extends, when the track 4 is fixed to the aircraft wing 3. By comparing FIGS. 3B and 4B, for example, it can be seen that here in the extended flap position Fe the leading edge 7 of the flap 2 is arranged closer to a topside 10 of the wing 3 and in the retracted flap position Fr the leading edge 7 of the flap 2 is arranged closer to an underside 11 of the wing 3. More generally, by such tilting of the track 4, the extended flap position Fe can advantageously correspond to a position relative to the wing 3 in which high-lift functionality is promoted, in particular optimized for the respective airfoil profile shapes of the wing 3 and the flap 2, for example in view of a spacing and/or relative orientation between such airfoil profile shapes.

In the shown examples, an extent of the range P of positions along the track 4 (see FIG. 2) corresponds to about 50% of the airfoil size of the flap 2, i.e. its size in the main airfoil direction D of the flap 2.

Figure 5B:
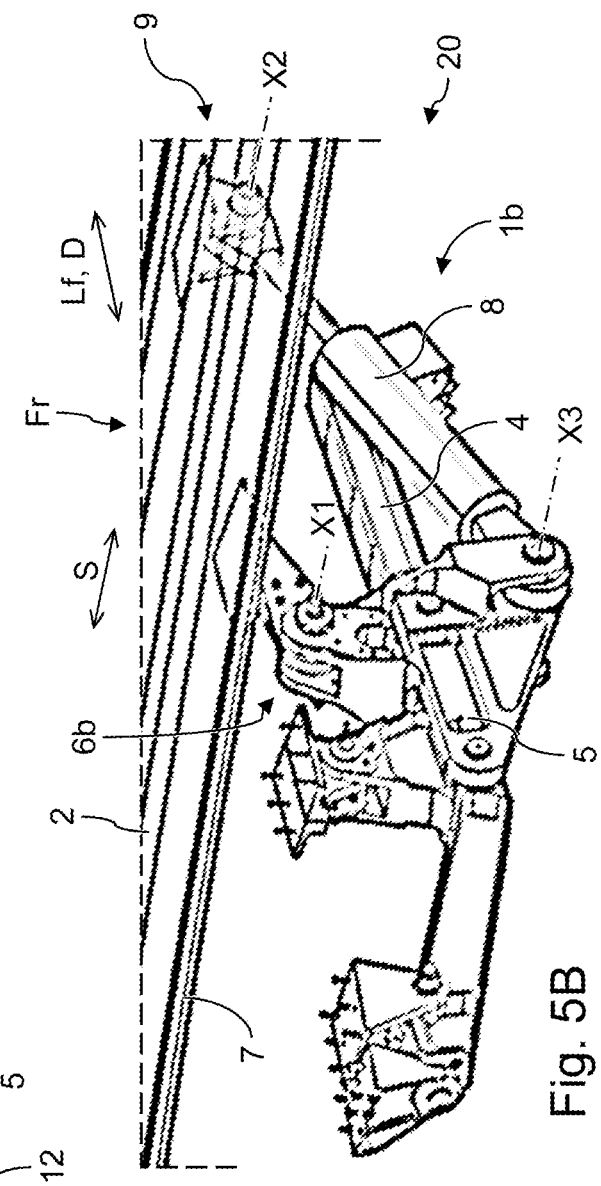

FIGS. 5A and 5B show examples of different possible variants 1a and 1b of the actuation assembly 1, as explained further below, wherein the flap 2 is shown partly transparent.

In the example of FIG. 5A, similar to what is shown in FIGS. 1 to 4C, the actuation assembly 1a, further comprises a second actuator 12 configured to controllably position the carriage 5 along the track 4, in particular across the range P of carriage positions. Such a second actuator 12 has also been indicated highly schematically in FIGS. 1 to 4C.

By contrast, in the example of FIG. 5B, the actuation assembly, here indicated as 1b to denote a different variant, is free from such a second actuator.

Further, in the example of FIG. 5A, the flap-to-carriage connector, here indicated as 6a, of the actuation assembly 1a is configured to permit one or more movements of the flap 2 with respect to the carriage 5 otherwise than about the flap-to-carriage hinging axis X1, in particular in one or more directions corresponding to a lateral or spanwise direction S of the wing 3. Specifically, in the example of FIG. 5A, it can be seen that the flap-to-carriage connector 6a permits a hinging of the carriage 5 with respect to the flap 2 about a hinging axis Y extending in the line-of-flight direction Lf.

By contrast, in the example of FIG. 5B, the flap-to-carriage connector, here indicated as 6b, of the actuation assembly 1b is configured to limit movement of the flap 9 with respect to the carriage 5 to rotations about the flap-to-carriage hinging axis X1 only.

It shall be appreciated that whether the flap-to-carriage connector 6 (i.e. 6a or 6b) permits or limits such movements of the flap 9 need not necessarily be linked to whether or not the respective actuation assembly 1 comprises a second actuator 12. Thus, for example, an actuation assembly whose flap-to-carriage connector permits such flap movements may be free from such a second actuator, and an actuation assembly whose flap-to-carriage connector limits such flap movements may comprise such a second actuator.

An example of a set 13 of actuation assemblies 1 for a trailing edge flap 2 of an aircraft wing 3 comprises at least one actuation assembly 1a as shown in FIG. 5A and at least one, with embodiments including only one, actuation assembly 1b as shown in FIG. 5B. Such a set 13 has also been indicated in FIGS. 6 and 7, wherein in FIG. 6 the actuation assemblies 1a and 1b are obscured by the flap 2 and the wing 3 and are thus merely shown by dash-dot lines to indicate their approximate positions under the flap 2 and the wing 3.

The figures also show examples of a trailing edge flap assembly 20 for an aircraft wing 3. The trailing edge flap assembly 20 comprises a trailing edge flap 2 for an aircraft wing 3 and at least one actuation assembly 1 as described herein, and embodiments may include a set 13 of actuation assemblies 1 as described herein.

The flap-to-carriage connector 6 of each actuation assembly 1 of the trailing edge flap assembly 20 hingeably connects the respective carriage 5 to a leading edge 7 of the flap 2. The first actuator 8 may be hingeably connected to the flap 2 at a flap engagement position 9 spaced apart from the leading edge 7 of the flap 2.

With particular reference to FIG. 7 as an example, an actuation system 14 for a trailing edge flap 2 of an aircraft wing 3 comprises at least one actuation assembly 1 and one or more control lines 15, for example hydraulic lines and/or electric lines, for operatively connecting at least the first actuator 8 of each actuation assembly 1 to a controller 17 outside the respective actuation assembly 1.

The actuation system 14 may comprise a trailing edge flap assembly 20 as described herein.

The at least one actuation assembly 1 of the actuation system 14 may comprise a set 13 as described herein, wherein for any actuation assembly 1b having a second actuator 12, the one or more control lines 15 may be for also for operatively connecting the respective second actuator 12 to the controller 17.

The control lines 15 may comprise separate lines for separately controlling each actuation assembly 1, in particular each first actuator 8. The control lines 15 may be flexible, at least at the actuation assembly 1, so as to flexibly connect to the movable first actuator 8.

In FIG. 7, it can be seen that actuation assemblies 1a comprising a second actuator 12 may be provided with a gear box 16 which may be controlled via a yet further control line 15 (indicated as a double line in FIG. 7). Such a gear box 16 may enable control of whether only the first actuator 8 or only the second actuator 12 is actuated, or both, and possibly in which ratio.

The actuation system 14 may further comprise the controller 17, wherein the controller 17 is configured to control the trailing edge flap 2 with respect to the aircraft wing 3 using the at least one actuation assembly 1.

Figure 6:
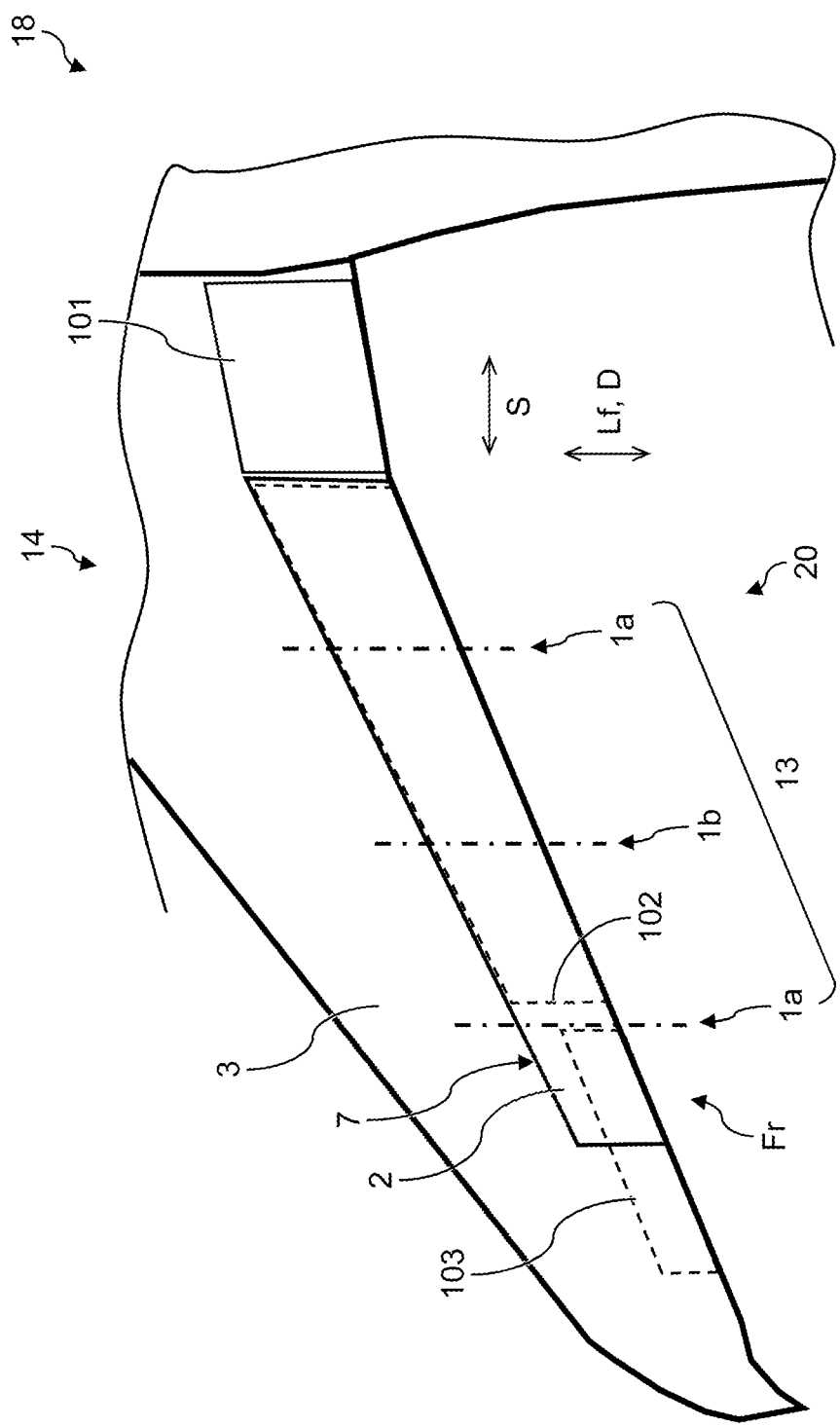
FIG. 6 shows a top view of an aircraft wing.

FIGS. 6 and 7 also show an example of an aircraft wing 3 provided with a trailing edge flap 2 and an actuation system 14 as described, arranged to actuate the flap 2 with respect to the aircraft wing 3, wherein the respective track 4 of each actuation assembly 1 of the actuation system 14 is fixed to the aircraft wing 3, in particular to extend along a line-of-flight direction Lf of the aircraft wing 3, wherein the respective flap-to-carriage connector 6 of each actuation assembly 1 of the actuation system 14 hingeably connects the respective carriage 5 to the leading edge 7 of the flap 2, in particular to determine the flap-to-carriage hinging axis X1.

Optionally, a traditional or other inboard flap 101 may be provided on the same wing 3. This may be particularly advantageous in case a trailing edge shape of the wing 3, viewed from above, is angled or otherwise complicates that the multifunctional flap 2 extends along an inboard section of the wing 3.

For reference, dashed lines in FIG. 6 indicate areas where traditionally a non-multifunctional outboard flap 102 and a separate aileron 103 might have been provided on a similar wing. It can be seen that the multifunctional trailing edge flap 2, since it can now provide full high-lift as well as aileron functionality, can extend further along the spanwise width of the wing 3 compared to the traditional outboard flap 102. Thus, by combining both functionalities in a single flap, increased design freedom is provided to accommodate a larger variety of requirements for aircraft wings, in particular for increased fuel efficiency due to more effective use of available space for control surfaces.

Optionally, so-called cruise rollers (not shown) may be provided on the wing 3 to support the flap 2 at its spanwise ends, at least in the retracted flap position Fr.

Optionally, one or more fairings (not shown) are provided to protect the actuation assembly 1 during use and to promote its aerodynamics. Multiple fairings or fairing parts may be provided at a same actuation assembly 1 to accommodate the various possible movements in the actuation assembly 1.

An aircraft 18 (see FIG. 6) may have one or more of such aircraft wings 3, e.g., one on each lateral side.

The figures also illustrate an example of a method of operating an aircraft 18, comprising: providing the aircraft 18; and, using the controller 17, adjusting the flap 2 between the retracted flap position Fr and the extended flap position Fe and/or rotating the flap 2 with respect to the carriage 5 about the flap-to-carriage hinging axis X1.

Using the controller, the flap 2 may be controlled to act, for example sequentially and/or simultaneously, both as a high-lift device, in particular in the extended flap position Fe, and as an aileron, in particular by flap rotation.

Although the disclosure has been explained herein using examples of embodiments and drawings, these do not limit the scope of the disclosure as defined by the claims. Many variations, combinations and extensions are possible, as will be appreciated by the skilled person. Examples thereof have been provided throughout the description. All such variants are included in the scope of the disclosure as defined by the claims.

LIST OF REFERENCE SIGNS 1 (1a, 1b). Actuation assembly
2. Trailing edge flap
3. Aircraft wing
4. Track
5. Carriage
6 (6a,6b). Flap-to-carriage connector
7. Leading edge of flap
8. First actuator
9. Flap engagement position
10. Topside of wing
11. Underside of wing
12. Second actuator
13. Set of actuation assemblies
14. Actuation system
15. Control line
16. Gear box
17. Controller
18. Aircraft
19. Spoiler
20. Trailing edge flap assembly
101. Traditional inboard flap
102. Traditional outboard flap
103. Traditional aileron
D. Main airfoil direction of flap
Fr. Retracted flap position
Fe. Extended flap position
Lf. Line-of-flight direction of wing
P. Range of carriage positions along the track
S. Lateral or spanwise direction
X1. Flap-to-carriage hinging axis
X2. First-actuator-to-flap hinging axis
X3. Carriage-to-first-actuator hinging axis Y. Hinging axis extending in line-of-flight direction
Θ. Range of flap-to-carriage angles

The invention claimed is:

1. An actuation assembly for a trailing edge flap of an aircraft wing, comprising:
   a track fixable to the aircraft wing;
   a carriage arranged on the track so as to be movable across a range of carriage positions along the track;
   a flap-to-carriage connector configured to hingeably connect the carriage to a leading edge of the flap so as to determine a flap-to-carriage hinging axis extending transverse to a main track direction of the track at the leading edge of the flap; and
   a first actuator configured to controllably rotate the flap with respect to the carriage about the flap-to-carriage hinging axis,
   wherein the actuation assembly is configured to enable the flap, when connected, to be adjusted with respect to the wing between a retracted flap position and an extended flap position by moving the carriage within the range of carriage positions along the track,
   wherein the first actuator is hingeably connected to the carriage about a carriage-to-first-actuator hinging axis extending substantially parallel to the flap-to-carriage hinging axis, and wherein the carriage is configured to arrange the carriage-to-first-actuator hinging axis and the flap-to-carriage hinging axis with respect to each other so as to be at a same position along the main track direction while being spaced apart in a direction transverse to the main track direction.

2. The actuation assembly according to claim 1, wherein the rotation of the flap about the flap-to-carriage hinging axis and the movement of the carriage along the track are mutually independent.

3. The actuation assembly according to claim 1, wherein the first actuator is configured to engage the flap at a flap engagement position spaced apart from the leading edge of the flap along the main track direction.

4. The actuation assembly according to claim 3, wherein the first actuator is configured to be hingeably connected to the flap about a first-actuator-to-flap hinging axis extending at the flap engagement position substantially parallel to the flap-to-carriage hinging axis.

5. The actuation assembly according to claim 1, wherein the first actuator comprises a linear actuator.

6. The actuation assembly according to claim 1, wherein the first actuator is configured to rotate the flap with respect to the carriage about the flap-to-carriage hinging axis across a range of flap-to-carriage angles, said range having a size of at least 20 degrees.

7. The actuation assembly according to claim 6, wherein the range of flap-to-carriage angles comprises both positive and negative angles, corresponding to both downward and upward aileron positions of the flap with respect to the wing.

8. The actuation assembly according to claim 1, wherein the track is configured to extend tilted with respect to a plane along which the aircraft wing mainly extends, when the track is fixed to the aircraft wing.

9. The actuation assembly according to claim 1, wherein an extent of the range of positions along the track corresponds to at least 30% of a chordwise size of the flap and/or a size of the flap along a line-of-flight direction of the wing.

10. The actuation assembly according to claim 1, further comprising a second actuator configured to controllably position the carriage along the track, across the range of carriage positions.

11. The actuation assembly according to claim 1, wherein the flap-to-carriage connector is configured to permit one or more movements of the flap with respect to the carriage otherwise than about the flap-to-carriage hinging axis, in one or more directions corresponding to a lateral or spanwise direction of the wing.

12. The actuation assembly according to claim 1, wherein the flap-to-carriage connector is configured to limit movement of the flap with respect to the carriage to rotations about the flap-to-carriage hinging axis only.

13. A trailing edge flap assembly for an aircraft wing, comprising a trailing edge flap for an aircraft wing and at least one actuation assembly according to claim 1, wherein the flap-to-carriage connector of each actuation assembly hingeably connects the respective carriage to a leading edge of the flap.

14. The trailing edge flap assembly according to claim 13, wherein the first actuator is hingeably connected to the flap at a flap engagement position spaced apart from the leading edge of the flap.

15. An actuation system for a trailing edge flap of an aircraft wing, comprising at least one actuation assembly according to claim 1 and one or more control lines for operatively connecting the first actuator of each actuation assembly to a controller outside the respective actuation assembly.

16. The actuation system according to claim 15, wherein the actuation assembly further comprises a second actuator configured to controllably position the carriage along the track, across the range of carriage positions, the one or more control lines are also for operatively connecting the respective second actuator to the controller.

17. The actuation system according to claim 15, wherein the flap-to-carriage connector of each actuation assembly hingeably connects the respective carriage to a leading edge of the flap.

18. The actuation system according to claim 15, further comprising the controller, wherein the controller is configured to control the trailing edge flap with respect to the aircraft wing using the at least one actuation assembly.

19. An aircraft wing provided with a trailing edge flap and an actuation system according to claim 15 arranged to actuate the flap with respect to the aircraft wing,
   wherein the respective track of each actuation assembly of the actuation system is fixed to the aircraft wing to extend along a line-of-flight direction of the aircraft wing, wherein the respective flap-to-carriage connector of each actuation assembly of the actuation system hingeably connects the respective carriage to the leading edge of the flap to determine the flap-to-carriage hinging axis.

20. An aircraft having one or more aircraft wings according to claim 19.

21. A method of operating an aircraft, comprising:
   providing an aircraft according to claim 20; and
   using the controller, adjusting the flap between the retracted flap position and the extended flap position and/or rotating the flap with respect to the carriage about the flap-to-carriage hinging axis.

22. The method according to claim 21, wherein, using the controller, the flap is controlled to act both as a high-lift device and as an aileron, sequentially and/or simultaneously.

23. A set of actuation assemblies for a trailing edge flap of an aircraft wing comprising:
   at least one first actuation assembly and at least one second actuation assembly each comprising:
   a track fixable to the aircraft wing;

a carriage arranged on the track so as to be movable across a range of carriage positions along the track;

a flap-to-carriage connector configured to hingeably connect the carriage to a leading edge of the flap so as to determine a flap-to-carriage hinging axis extending transverse to a main track direction of the track at the leading edge of the flap; and a first actuator configured to controllably rotate the flap with respect to the carriage about the flap-to-carriage hinging axis, wherein the actuation assembly is configured to enable the flap, when connected, to be adjusted with respect to the wing between a retracted flap position and an extended flap position by moving the carriage within the range of carriage positions along the track wherein the first actuator is hingeably connected to the carriage about a carriage-to-first-actuator hinging axis extending substantially parallel to the flap-to-carriage hinging axis, and wherein the carriage is configured to arrange the carriage-to-first-actuator hinging axis and the flap-to-carriage hinging axis with respect to each other so as to be at a same position along the main track direction while being spaced apart in a direction transverse to the main track direction;

wherein the flap-to-carriage connector of the at least one first actuation assembly is configured to permit one or more movements of the flap with respect to the carriage otherwise than about the flap-to-carriage hinging axis, in one or more directions corresponding to a lateral or spanwise direction of the wing and wherein the flap-to-carriage connector of the at least one second actuation assembly is configured to limit movement of the flap with respect to the carriage to rotations about the flap-to-carriage hinging axis only.

24. An actuation system for a trailing edge flap of an aircraft wing, comprising at least one first actuation assembly and at least one second actuation assembly according to claim 23 and one or more control lines for operatively connecting the first actuator of each actuation assembly to a controller outside the respective actuation assembly.

* * * * *